UNITED STATES PATENT OFFICE.

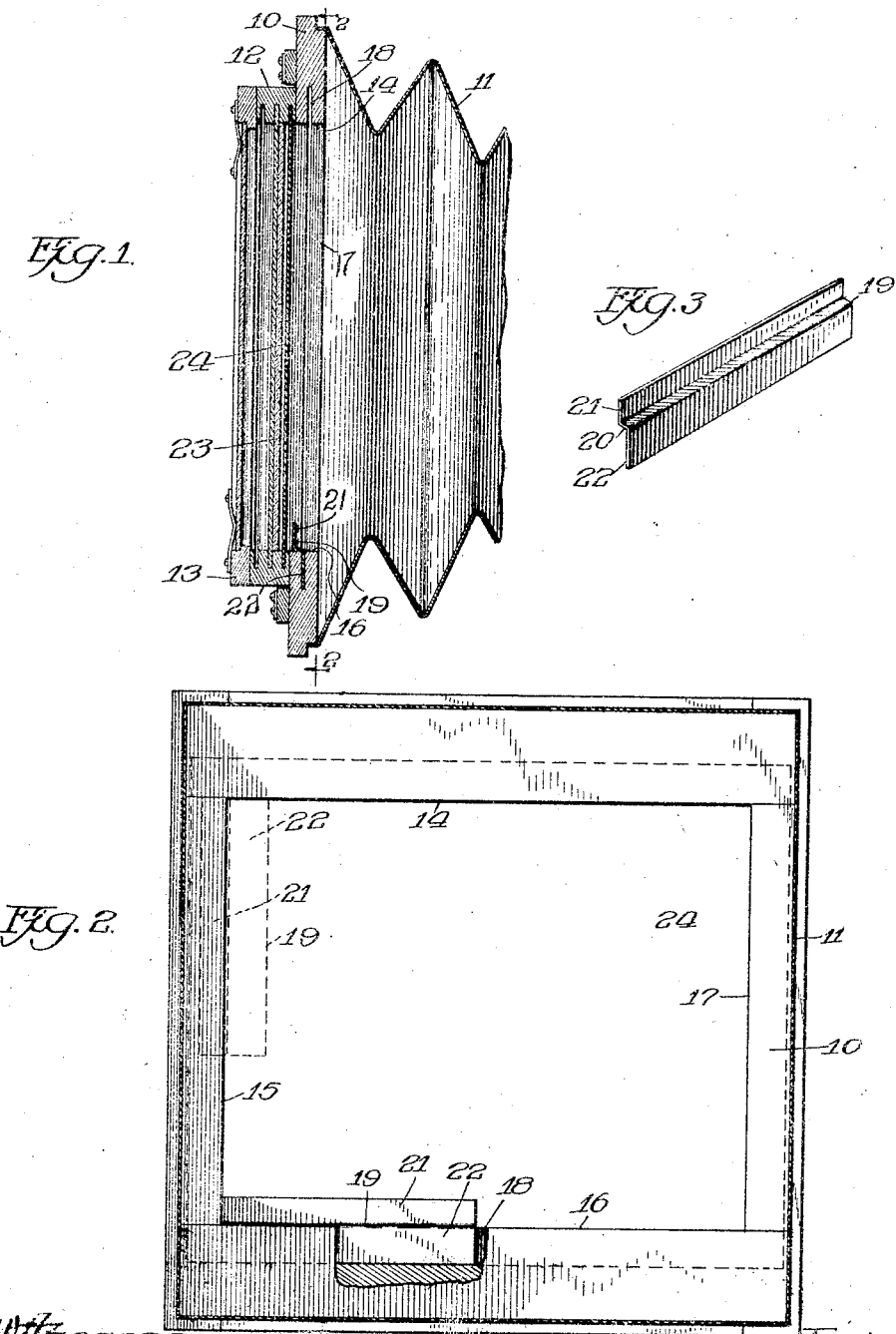

WALTER H. MARTIN, OF BELOIT, WISCONSIN.

LEGEND DEVICE FOR CAMERAS.

1,190,442.   Specification of Letters Patent.   Patented July 11, 1916.

Application filed June 30, 1915.  Serial No. 37,139.

*To all whom it may concern:*

Be it known that I, WALTER H. MARTIN, a citizen of the United States, residing at Beloit, in the county of Rock and State of Wisconsin, have invented certain new and useful Improvements in Legend Devices for Cameras, of which the following is a specification.

My invention resides in improvements in cameras in general, but refers more particularly or especially to features of novelty in constructions adapted to provide legend or marking spaces on the negatives produced by means of such cameras.

One salient feature of the invention is the provision of extremely simple means adapted to provide a blank space on the negative and adjustable as to the position of such space and as to its area or extent.

In the preferred embodiment of the construction, which is susceptible of employment in cameras of all kinds, a member is employed in rather close association with the sensitized medium to prevent the light from acting upon a definite area thereof, so that when the plate or film is developed a blank space will be provided thereon on which a legend may be imprinted. In one desirable form of this device, the camera around the opening through which the light passes adjacent to the sensitized film or plate, is equipped with a groove adapted to receive a portion of the light-obstructing member, the latter being adjustable in the groove to vary the position of the legend blank and also reversible to modify the size of such blank.

In order that those skilled in this art may have a full and complete understanding of this invention, I have illustrated an embodiment of the same in the accompanying drawings which form a part of this specification and to which reference should be had in connection with the following detailed description.

In these drawings: Figure 1 is a fragmentary vertical section through a portion of a camera; Fig. 2 is a section on line 2—2 of Fig. 1, the parts being viewed in the direction indicated by the arrows; and Fig. 3 is a perspective view of the legend blank forming member.

The camera may be of any suitable style or form of construction. Its rear frame 10 (Figs. 1 and 2), is associated with the usual expansible and collapsible bellows or accordion-plaited structure 11 and is adapted to receive a plate-holder 12 between itself and the spring-mounted ground-glass holder 13, all of these parts being of the usual and customary construction. Instead of the plate-holder and dry-plate, cut or rolled films may readily be employed.

The four inner faces 14, 15, 16, and 17 of the frame or wall 10 are provided with a continuous groove 18, any portion of which is adapted to receive the light-obstructing or legend-blank-producing member 19. This latter is desirably made of sheet-metal bent to provide a central portion or web 20 from which extend in opposite directions two offset wings or flanges 21 and 22, the former being only approximately one-half as wide as the latter. When the flange 22 is placed in the groove 18, the part 20 will rest on the inner-face of the frame 10, as shown in Figs. 1 and 2, the portion 21 projecting into the aperture of the frame directly in front of the sensitized plate 23, obscuring a portion thereof, and preventing the light from acting on such section during the usual exposure of the plate after the slide 24 of the plate-holder has been removed. Due to the fact that the flange 19 is close to the surface of the sensitized dry-plate 23, the edges of the legend blank formed will be sharp and not blurred.

The flange 21 may be of a width to produce a blank space on the negative suitable for the reception of a one-line legend. In case a larger blank is desired, such as will accommodate a two-line legend, the flange 21 is inserted in the groove 18, permitting the wider flange 22 to obstruct the light passing to the plate. It is preferable in either instance to so position the member 19 that the upstanding flange will be close to the plate rather removed therefrom by reason of the offset referred to. This is clearly illustrated in Fig. 1.

Owing to the capability of the member sliding in the groove, its position may be readily adjusted and the member may be employed on any one of the four faces of the frame. A second position for such member is illustrated in dotted lines in the upper left-hand portion of Fig. 2.

While I have herein presented in detail a desirable embodiment of the invention, it is to be understood that many minor mechanical changes may be incorporated in the device without departure from the substance of the invention and without the sacrifice of any of its substantial benefits and advantages. For example, the legend member might be adjustably positioned on the plate-holder, considering the latter as a part of the operative camera structure.

I claim:

1. In a device of the character described, the combination of a camera having a groove adjacent to the opening through which the sensitized medium is exposed to the light, and a member adapted to be detachably accommodated partially in any part of said groove and project therefrom slightly to shield a portion of the sensitized medium near the margin only thereof to prevent exposure of such portion during the subjecting of such medium to the action of light in taking the picture, whereby to leave a blank space on the negative in addition to the usual unexposed marginal portion for the reception of a legend, said member being removable from said groove by a bodily movement thereof out of the groove and inwardly of the camera, substantially as described.

2. In a device of the character described, the combination of a camera having a groove adjacent to the opening through which the sensitized medium is exposed to the light, and a member adapted to be detachably accommodated partially in any part of said groove and project therefrom slightly to shield a portion of the sensitized medium near the margin only thereof to prevent exposure of such portion during the subjecting of such medium to the action of light in taking the picture, whereby to leave a blank space on the negative in addition to the usual unexposed marginal portion for the reception of a legend, said member being adjustable in said groove to vary the area of said blank space and removable from the groove by a bodily movement thereof out of the groove and inwardly of the camera, substantially as described.

3. In a device of the character described, the combination of a photographic camera grooved adjacent to the opening through which the sensitized medium is exposed to the light, and a reversible member having two offset portions of different areas either of which is adapted to be received in the groove while the other overlies a marginal portion of the sensitized medium to prevent exposure thereof during the subjecting of such medium to the action of light in taking the picture, whereby to leave a blank space on the negative for the reception of a legend in addition to the usual unexposed marginal portion, substantially as described.

WALTER H. MARTIN.